(12) United States Patent
Buthler et al.

(10) Patent No.: US 12,389,376 B2
(45) Date of Patent: Aug. 12, 2025

(54) RESOURCE COLLISION AVOIDANCE IN SIDELINK FOR DISCONTINUOUS RECEPTION (DRX)

(71) Applicant: Nokia Technologies Oy, Espoo (FI)

(72) Inventors: Jakob Buthler, Aalborg (DK); Berthold Panzner, Holzkirchen (DE); Lianghai Ji, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 454 days.

(21) Appl. No.: 17/998,996

(22) PCT Filed: Jun. 8, 2021

(86) PCT No.: PCT/IB2021/055044
§ 371 (c)(1),
(2) Date: Nov. 16, 2022

(87) PCT Pub. No.: WO2021/250574
PCT Pub. Date: Dec. 16, 2021

(65) Prior Publication Data
US 2023/0171740 A1     Jun. 1, 2023

Related U.S. Application Data

(60) Provisional application No. 63/038,487, filed on Jun. 12, 2020.

(51) Int. Cl.
*H04W 72/02*     (2009.01)
*H04W 72/0446*     (2023.01)
*H04W 76/28*     (2018.01)

(52) U.S. Cl.
CPC ....... *H04W 72/02* (2013.01); *H04W 72/0446* (2013.01); *H04W 76/28* (2018.02)

(58) Field of Classification Search
CPC . H04W 72/02; H04W 72/0446; H04W 76/28; H04W 76/14; Y02D 30/70
See application file for complete search history.

(56) References Cited

U.S. PATENT DOCUMENTS 9,661,683 B2 * 5/2017 Horneman ........ H04W 52/0216
2011/0237231 A1 * 9/2011 Horneman ........ H04W 52/0216
                                               455/414.1

(Continued)

FOREIGN PATENT DOCUMENTS

EP     2345299 A1     7/2011
WO     2010/025774 A1     3/2010

(Continued)

OTHER PUBLICATIONS

Intelligent Slicing of Radio Resource Control Layer for Cellular IoT: Design and Implementation (Year: 2020).*

(Continued)

*Primary Examiner* — Joseph E Avellino
*Assistant Examiner* — Anindita Sen
(74) *Attorney, Agent, or Firm* — Barta Jones, PLLC

(57) ABSTRACT

Systems, methods, apparatuses, and computer program products for resource collision avoidance in sidelink for discontinuous reception (DRX). For example, certain embodiments described herein may help to ensure a reliable method for reaching a power saving solution for an autonomous resource selection, using a fixed set of rules, based on concepts of sub-pools. This may be done by indicating a set of resources to user equipment (UEs), which may be used for sensing and selection. The resources provided may be offset by a number of resources selected at random, based on UE-identifier, or as otherwise indicated.

5 Claims, 11 Drawing Sheets

(56) References Cited

U.S. PATENT DOCUMENTS

| | | | |
|---|---|---|---|
| 2015/0334656 A1 | 11/2015 | Ji et al. | |
| 2016/0044605 A1* | 2/2016 | Vajapeyam | H04W 76/28 370/311 |
| 2016/0234780 A1* | 8/2016 | Chakrapani | H04W 52/02 |
| 2017/0289940 A1* | 10/2017 | Yang | H04W 76/27 |
| 2020/0015313 A1 | 1/2020 | Reial et al. | |
| 2021/0136689 A1* | 5/2021 | Kim | H04W 24/08 |
| 2022/0104300 A1* | 3/2022 | Ramachandra | H04W 24/10 |
| 2022/0256328 A1* | 8/2022 | Xie | H04W 76/28 |
| 2023/0066448 A1* | 3/2023 | Tseng | H04W 72/20 |
| 2023/0345559 A1* | 10/2023 | Li | H04L 1/1812 |

FOREIGN PATENT DOCUMENTS

| | | |
|---|---|---|
| WO | 2017/171477 A1 | 10/2017 |
| WO | 2018/064477 A1 | 4/2018 |

OTHER PUBLICATIONS

Impact of Extended DRX Cycles on Battery Lifetimes and UE Reachability (Year: 2016).*

"New WID on NR sidelink enhancement", 3GPP TSG RAN Meeting #86, RP-193257, Agenda: 9.1.1, LG Electronics, Dec. 9-12, 2019, 6 pages.

"3rd Generation Partnership Project; Technical Specification Group Radio Access Network; NR; Physical layer procedures for data (Release 16)", 3GPP TS 38.214, V16.1.0, Mar. 2020, pp. 1-151.

"Rel-17 sidelink for V2X—Automotive Perspective Challenges", 3GPP TSG RAN Meeting #86, RP-192980, Agenda: 9.1.1, GM ATCI, Dec. 9-12, 2019, pp. 1-8.

Bonjorn et al., "Cooperative Resource Allocation and Scheduling for 5G eV/2X Services", IEEE Access, vol. 7, Jan. 15, 2019, pp. 58212-58220.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Study on LTE Device to Device Proximity Services; Radio Aspects (Release 12)", 3GPP TR 36.843, V12.0.1, Mar. 2014, pp. 1-50.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-38.

International Search Report and Written Opinion received for corresponding Patent Cooperation Treaty Application No. PCT/IB2021/055044, dated Aug. 26, 2021, 11 pages.

* cited by examiner

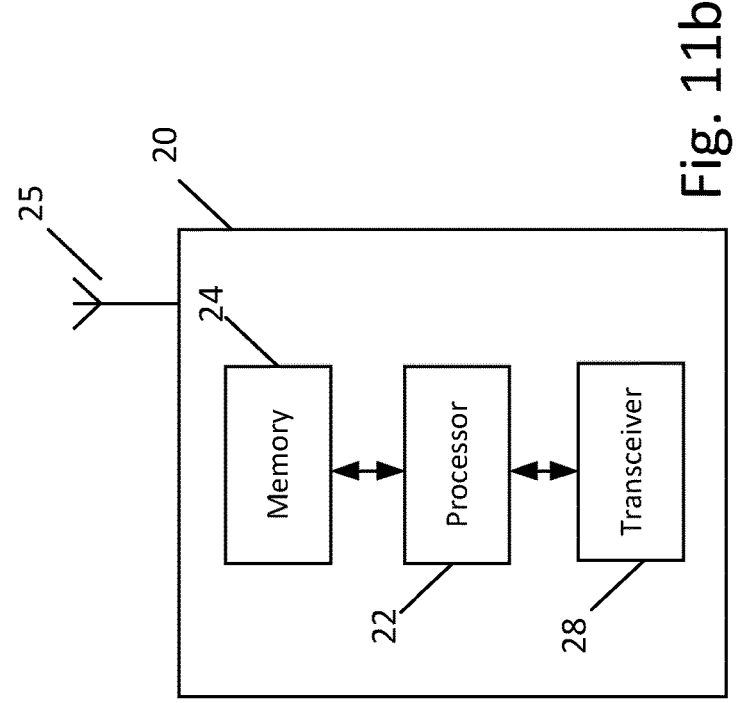
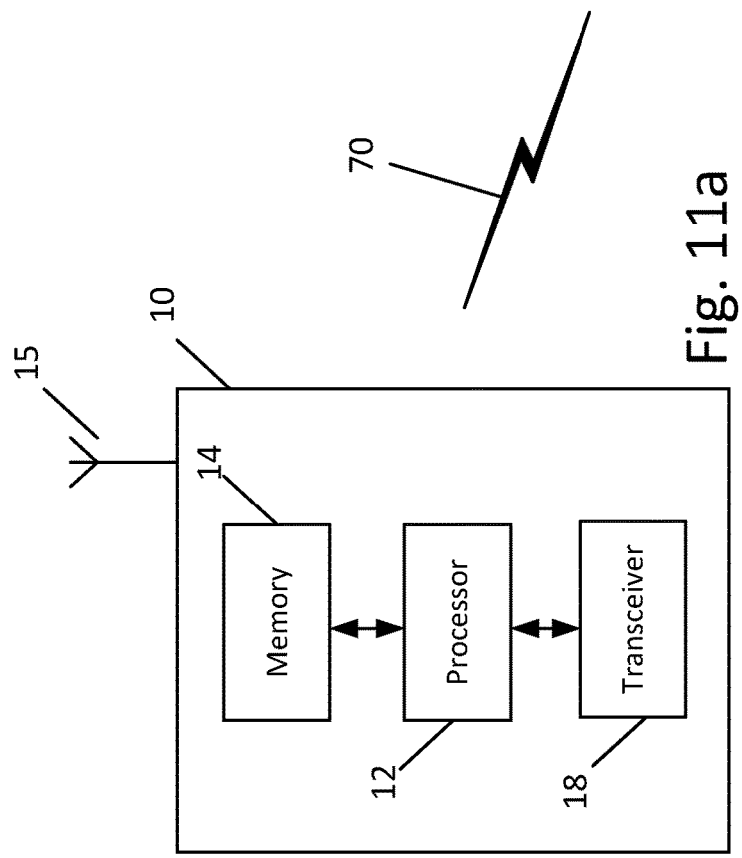

RESOURCE COLLISION AVOIDANCE IN SIDELINK FOR DISCONTINUOUS RECEPTION (DRX)

RELATED APPLICATION

This application was originally filed as PCT Application No.PCT/IB2021/055044, filed on Jun. 8, 2021, which claims priority from U.S. Provisional Application No. 63/038,487 filed on Jun. 12, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for resource collision avoidance in sidelink for discontinuous reception (DRX).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include obtaining a configuration that configures one or more start times for one or more resource selection windows after a start time of a discontinuous reception cycle on-duration. The one or more start times for the one or more resource selection windows may be indicated by corresponding offsets to the start time of the discontinuous reception cycle on-duration. The method may include selecting a DRX period. The method may include selecting an offset from the corresponding offsets. The method may include starting sensing. The method may include transmitting, to one or more other user equipment, data at a time within a resource selection window starting at the start time of the discontinuous reception cycle on-duration plus the offset.

In a variant, the obtaining the configuration may include obtaining the configuration via reception of a configuration message that comprises the configuration, or obtaining the configuration via a setting. In a variant, the offset may be selected as a value equal to a size of the resource selection window, or the time for the transmission may be selected within the resource selection window. In a variant, the offset may be within a range of values based on the size of the resource selection window and a quantity of resource selection windows configured. In a variant, the method may further include obtaining information that identifies at least one of a set of sensing results indicating a resource usage, a set of suggestions for improved re-selection of a parameter, or new values for the one or more offsets. In a variant, the method may further include re-selecting the offset based on the set of suggestions or from the new values, and/or re-calculating sizes of the corresponding resource selection windows or the quantity of resource selection windows based on the set of sensing results and/or suggestions.

In a variant, the selecting the offset may further include selecting the offset based on at least one of: random selection, wherein a probability distribution associated with the random selection of the offset may vary for different random selections, an identifier associated with the user equipment, or an identifier associated with a destination or a source of the transmission or another lower layer identifier. In a variant, the resource selection window may end before a start time of a next resource selection window. In a variant, selecting the offset may further include selecting the offset based on one or more identifiers associated with the one or more other user equipment such that the selected offset does not result in a collision with one or more other offsets selected by the one or more other user equipment.

According to a second embodiment, a method may include receiving data. The method may include obtaining at least one of a set of sensing results indicating resource usage, a set of suggestions for improved re-selection of a parameter, or new values for the one or more offsets that indicate one or more start times for one or more resource selection windows after a start time of a discontinuous reception cycle on-duration. The method may include at least one of: transmitting, to one or more user equipment, information that identifies the at least one of the set of sensing results, the set of suggestions, or the new values, or re-selecting the offset based on the set of suggestions or the new values, and re-calculating sizes of the one or more resource selection windows associated with the one or more offsets or a quantity of resource selection windows based on the set of sensing results. The method may include receiving other data.

In a variant, the set of sensing results may be based on sensing by a user equipment, where the user equipment did not perform a transmission during the discontinuous reception cycle on-duration. In a variant, the set of sensing results may be based on sensing that comprises one or more reports related to an occupancy of a channel. In a variant, the resource usage may indicate an occupancy of a channel. In a variant, the device may include at least one of a group leader user equipment, a master user equipment, or a network entity.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 11a illustrates an example block diagram of an apparatus, according to an embodiment; and FIG. 11b illustrates an example block diagram of an apparatus, according to another embodiment.

DETAILED DESCRIPTION

Figure 1:
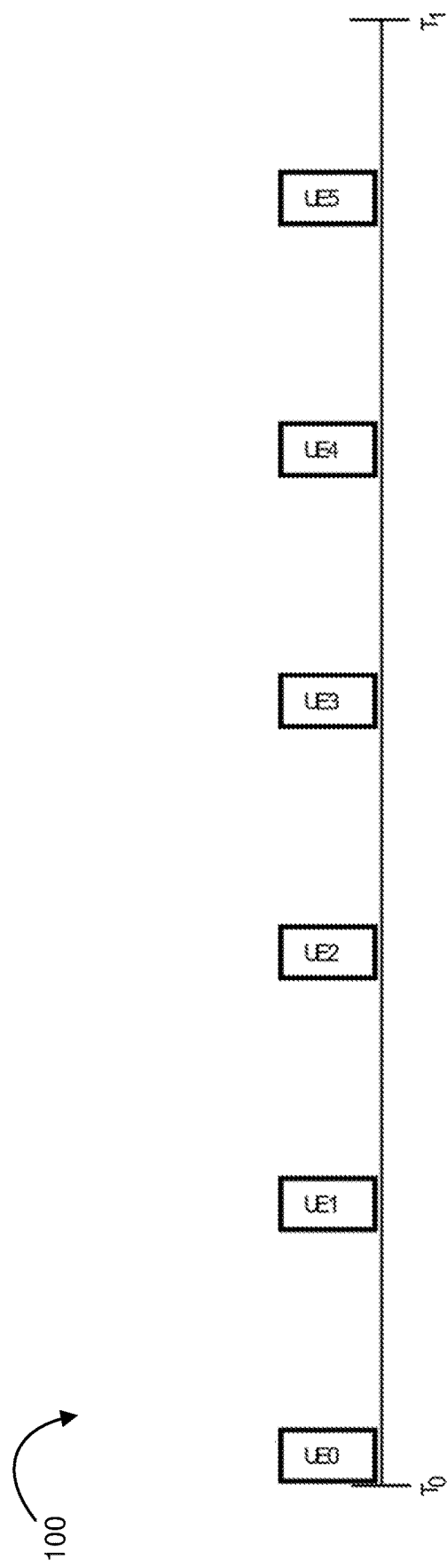
FIG. 1 illustrates an example of a result for DRX operation.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for resource collision avoidance in sidelink for DRX is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may specify radio solutions that can enhance NR sidelink for vehicle-to-everything (V2X) application, public safety applications, commercial application, and/or the like. With respect to resource allocation, aspects of NR may specify resource allocation for reducing power consumption of UEs. For inter-UE coordination, aspects of NR may specify enhancements in mode 2 operation for enhanced reliability and reduced latency in consideration of both packet reception ratio (PRR) and packet inter-reception (PIR). Related to this is inter-UE coordination, where a set of resources that is determined at a first UE (UE-A) is sent to a second UE (UE-B) in mode 2 operation, and the UE-B takes the set of resources into account in resource selection for the UE-B's transmission. With respect to sidelink DRX for broadcast, groupcast, and unicast, aspects of NR may specify a mechanism to align sidelink DRX wake-up time among the UEs communicating with each other and/or may specify a mechanism to align sidelink DRX wake-up time with Uu DRX wake-up timing in an in-coverage UE.

Resource allocation with respect to the above may be for the purpose of power saving (defining sidelink DRX for broadcast, groupcast, and unicast), as well as to enhance the reliability and latency for mode 2 resource selection. In mode 1 operation resource selection, the resources may be granted by the network, and, therefore, may have a single entry point to ensure that the sidelink (SL) resources do not overlap. In mode 2 resource selection, however, the UE may autonomously select a set of resources within a resource selection window from [n, n+x], based on the outcome of a sensing procedure occurring in the time [n-y,n].

As a UE in mode 2 sidelink resource allocation may autonomously select the radio resources to use, there may be a risk that multiple sidelink UEs will select the same time-and/or-frequency-domain resource. This may be a problem when the resource reservation is reserved periodically/continuously in time, where such collisions may continue over a significant amount of resources. As such, there may be a need for this procedure to be enhanced in such a way that the resource selection avoids colliding resources. It is noted, the mentioned resource collision may be either time-domain resource collision (e.g., multiple UEs select the resources in the same time instance) or time-and-frequency-domain resource collision (e.g., the selected resources of two UEs are overlapping both in time and frequency domain).

The mode 2 selection may have three primary random elements which may help ensure an equal distribution amongst the resources: 1) nonsynchronous operation by the application/V2X layers (which may result in the selection of a different time n); 2) random selection of a set of x valid resources; and 3) random selection of a time in which the reservation (or grant or resource reservation) is active. Although several steps may be taken with this mechanism, the latency may have to also be minimal In addition, the value range that can be randomly selected may be small, increasing the risk that two or more UEs might select the same resource. Further, by using DRX, at least some of the randomness that might occur is removed as, regardless of when the application/V2X layer determines that a packet should be sent, the resource selection window starting at time (n) may likely be set to the nearest on-duration of the DRX cycle.

FIG. 1 illustrates an example of a result 100 of DRX operation. In FIG. 1, for example, 6 UEs (UE0, UE1, UE2, UE3, UE4, and UE5) have autonomously chosen resources evenly spread within the DRX period from T0 to T1. The result 100 in the example of FIG. 1 may be undesirable as a UE listens for a longer time period than what is necessary due to non-occupied resources.

Figure 2:
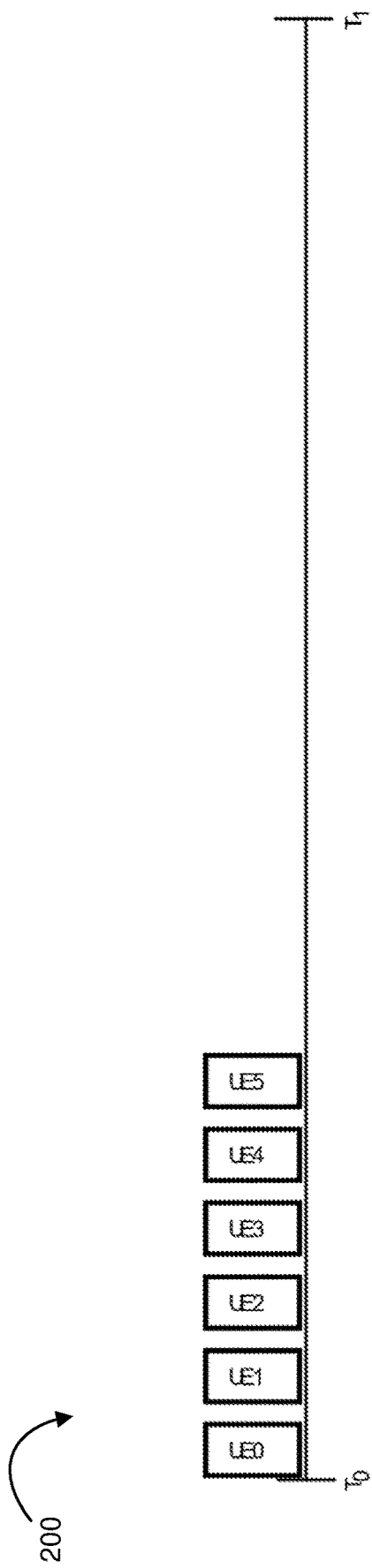
FIG. 2 illustrates an example of another result for DRX operation.

FIG. 2 illustrates an example of another result 200 for DRX operation. For example, the result illustrated in FIG. 2 may be the result of an optimal DRX procedure from a power efficiency perspective, where the UEs select resources in a sequential manner, without unused resources in between.

Figure 3:
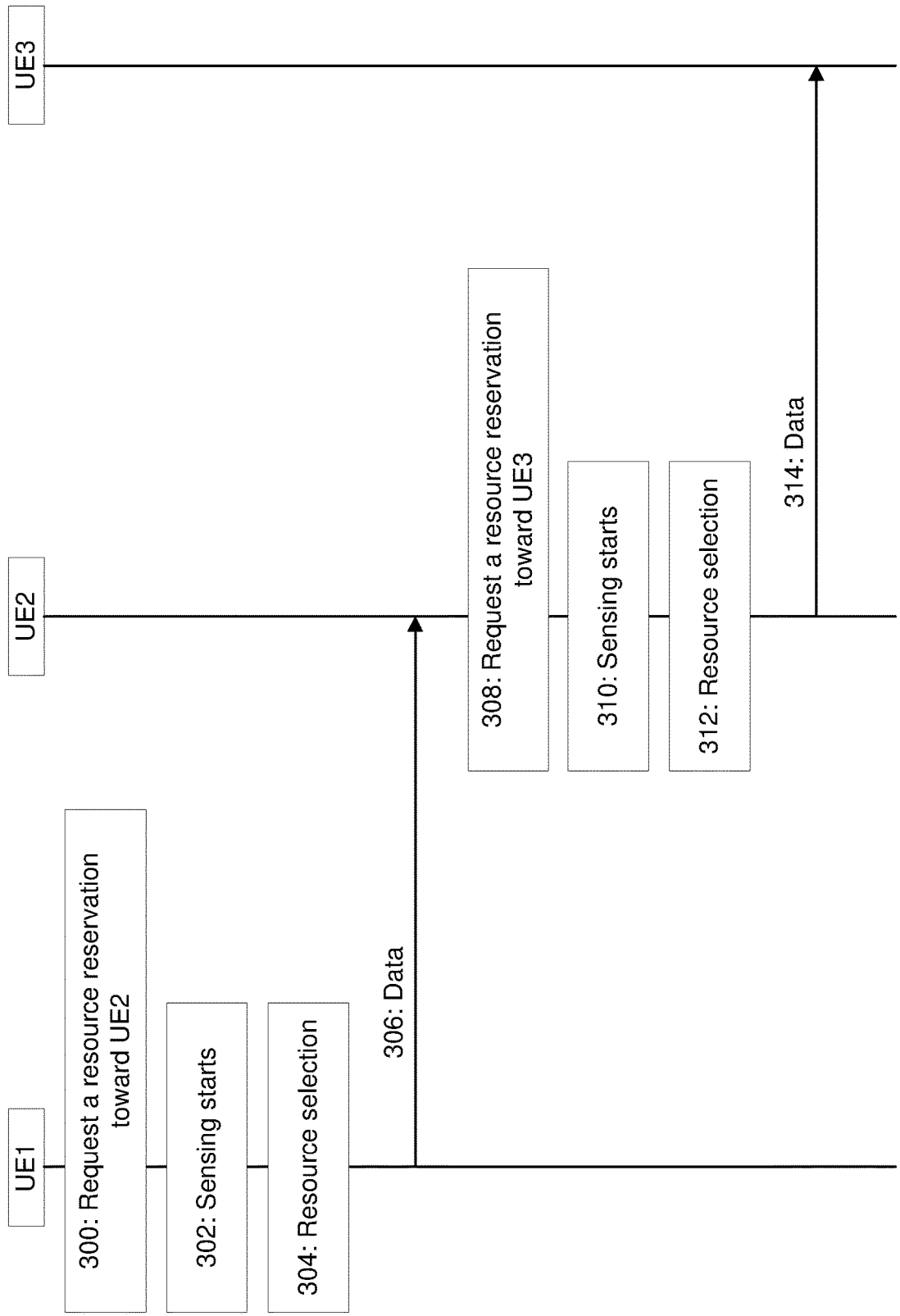
FIG. 3 illustrates an example of resource selection without DRX operation.
Figure 4:
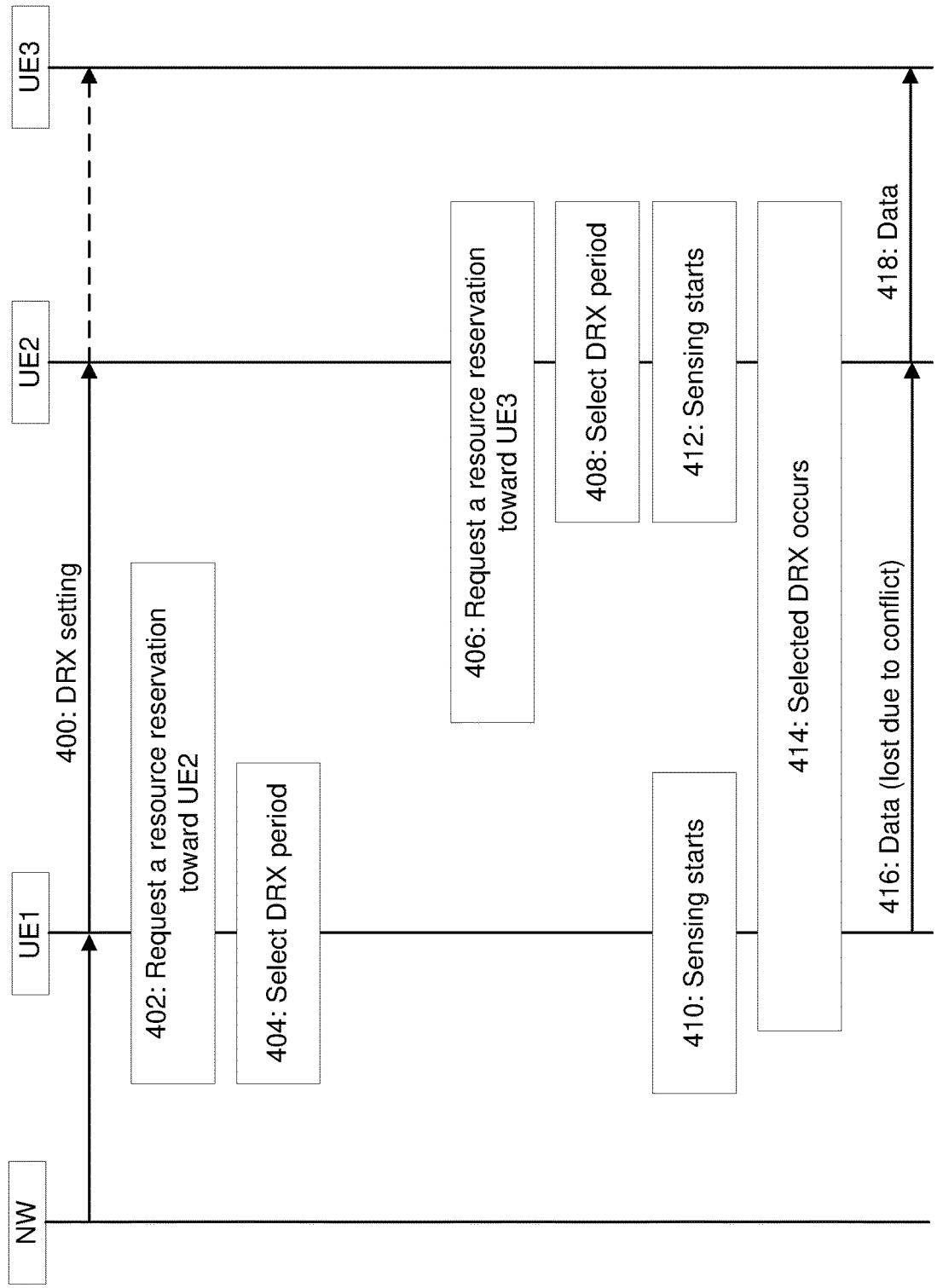
FIG. 4 illustrates an example of resource selection with DRX operation.

The DRX induced problem described above can be understood through the example operations illustrated in FIGS. 3 and 4. Specifically, FIG. 3 illustrates an example of resource selection without DRX operation. At 300, a UE1 may request a resource reservation towards the UE2. Sensing, by the UE1, may start at 302. At 304, the UE1 may perform a resource selection, and the UE1 may transmit data to the UE2 at 306. At 308, a UE2 may request a resource reservation towards UE3. Sensing, by the UE2, may start at 310. At 312, the UE2 may perform a resource selection, and the UE2 may transmit data to the UE3 at 314.

FIG. 4 illustrates an example of resource selection with DRX operation. At 400, a network may transmit a DRX setting to a UE1, a UE2, and a UE3. At 402, the UE1 may request a resource reservation toward the UE2. The UE1 may select a DRX period at 404. At 406, the UE2 may request a resource reservation toward the UE3. The UE2 may select a DRX period at 408. Sensing, by the UE1 and the UE2, may start at 410 and 412, respectively. The DRXs selected by the UE1 and the UE2 occurs at 414. At 416, the UE1 may transmit data to the UE2, which is lost due to a conflict between selected resources. As one example, the confliction may take place due to the half duplex constraint at UE2. As another example, the confliction may be due to the fact that UE1 and UE2 transmit over the overlapping time-and-frequency resources. At 418, the UE2 may transmit data to the UE3.

In FIG. 3, at each point in time where the UE1 gets data from the higher layers, the UE1 may reuse already assigned resources, or may use operation modes 1 and 2 to select either a periodic resource or a dynamic grant. Assuming the UE selects a new resource using mode 2, then the resource selection may be preceded by a sensing procedure, and a selection procedure. In FIG. 4, introducing DRX may align the sensing and selection procedures, increasing the probability of a collision of the selected resources. From the example of FIG. 4, it can be understood that, although aligning UE operations in the time domain may be beneficial for power saving purposes, with respect to avoiding colliding resource allocations, it may negatively impact the probability of such occurrences as it may increase the density of UEs choosing the same resource selection window.

In NR, collision in resource selection may be handled by certain operations. When autonomously selecting a resource in the selection window, the UE selects the resource from a set of potential resources where a random selection with equal probability should occur. The set is defined as the best x resources with an interference below a threshold. The selected resource may be maintained within a certain timeframe. This timeframe may also be randomly chosen within limits based on, for example, the packet delay budget of the data. In addition, some attempts to solve the above identified problems may involve DRX randomization concepts that utilize monitoring of time division duplex (TDD) patterns of a cell or other monitoring, such as Doppler shifts before a DRX cycle on-duration. Further, there have been some other attempts to solve the above identified problems for idle mode UEs by utilizing downlink candidate beams.

Some embodiments described herein may provide for resource collision avoidance in sidelink for DRX. For example, certain embodiments described herein may help to ensure a reliable method for reaching a power saving solution for an autonomous resource selection, using a fixed set of rules, based on concepts of sub-pools. This may be done by indicating a set of resources to the UEs, which may be used for sensing and selection. The resources provided may be offset by a number of resources selected at random, based on UE-identifier, or as otherwise indicated.

Figure 5:
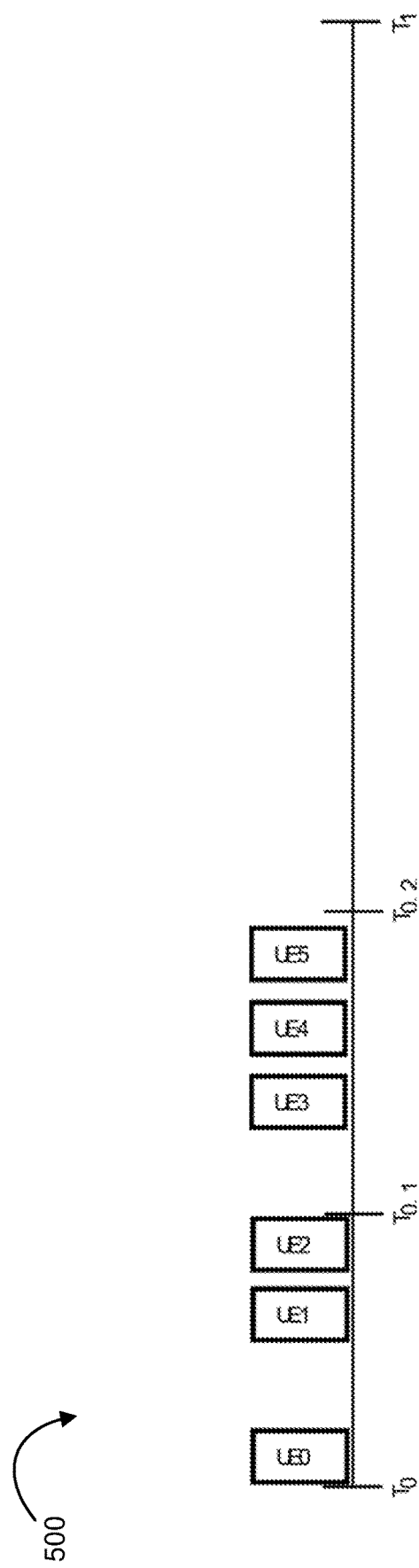
FIG. 5 illustrates an example result of resource collision avoidance in sidelink for DRX, according to some embodiments.

FIG. 5 illustrates an example result 500 of resource collision avoidance in sidelink for DRX, according to some embodiments. As depicted in FIG. 5, one objective may be to reach a scenario as close to the optimal as possible (e.g., as close to the result 200). Resource selection windows may be indicated by an offset (k) to a start time (n). The offset (k) can be within a range of [0, s, s*2, s*$N_{windows}$], with (s) representing the size of the window in samples, frames, or milliseconds, and $N_{windows}$ representing the maximal number of windows configured (e.g., by radio resource control (RRC) or preconfiguration, or dynamic configuration). The value of k, s and $N_{windows}$ may be derived in various ways, as explained elsewhere herein. In some embodiments, $N_{windows}$*S (or S*$N_{windows}$) may be smaller than the DRX period (e.g., there may be some unused resources).

To obtain the scenario depicted in FIG. 5 in mode 1 operation, there may have to be some coordination among UEs. To obtain the scenario depicted in FIG. 5 in mode 2 operation, rules on top of the resource selection process may have to be used. These rules may include, for example, setting a higher probability to select early resources within the provided resource selection window. Such rules may limit the resource pool to some extent. One condition for the resource collision to happen is that the UEs selecting resources select from the same set of resources (e.g., based on the 20 percent, or some other percentage, best sensing results within the sensing period). Thus, in certain embodiments, a window size may be greater than a certain amount of the best sensing results (e.g., greater than 20 percent, or the other percentage, of the DRX time), which may result in there being a higher probability of selected resources being in different DRX periods than being selected simultaneously.

Furthermore, certain embodiments may include changing the value k, number of windows, or duration of windows (s). This may enable the selection to be controlled based on the congestion of the system (e.g., if there are few UEs, then the number of windows may be few, along with a lower spread of k, and if there are several UEs, the number of windows may be higher, with a greater spread of k).

Figure 6:
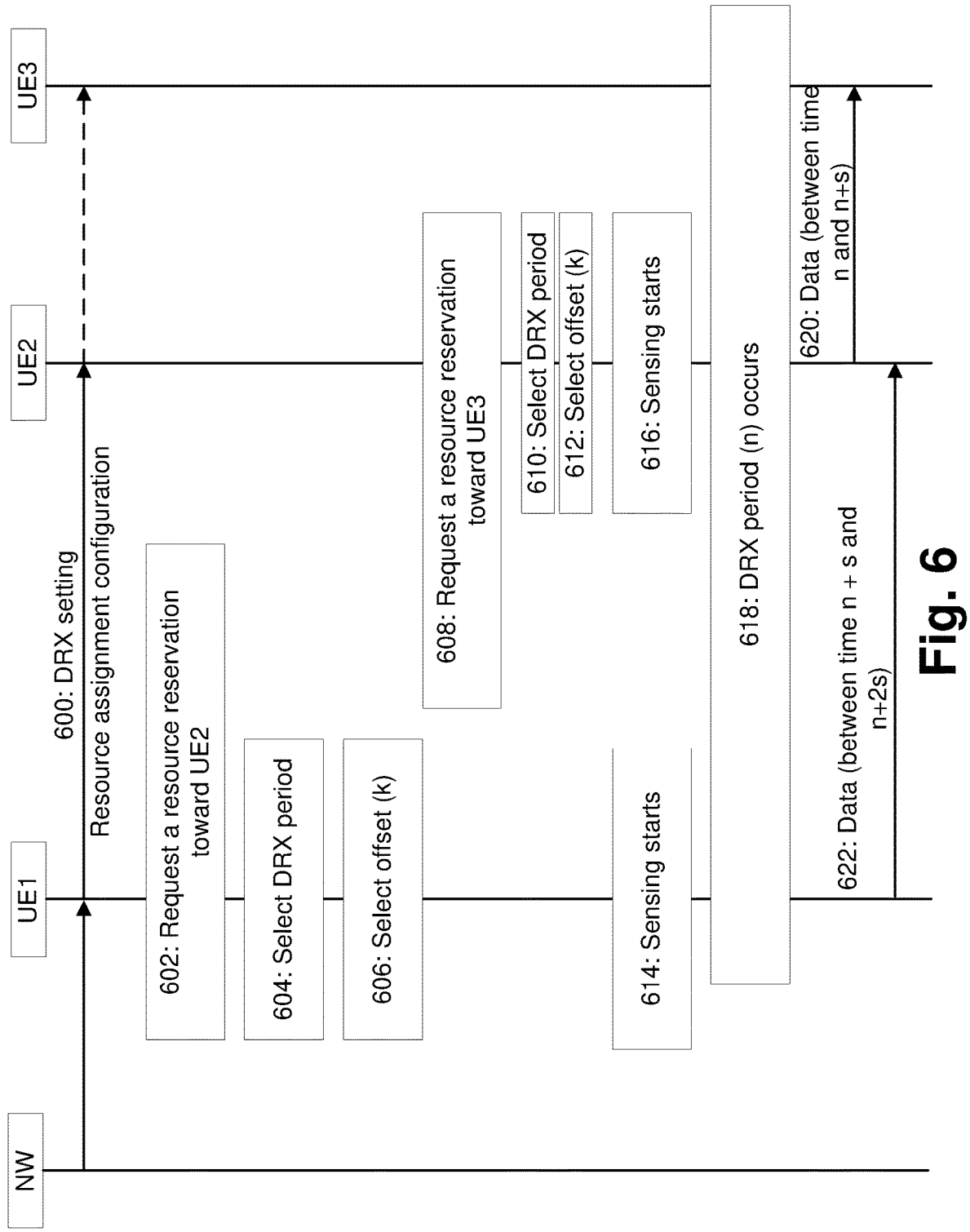
FIG. 6 illustrates an example signal diagram of static selection of certain parameters in connection with resource collision avoidance in sidelink for DRX, according to some embodiments.

FIG. 6 illustrates an example signal diagram of static selection of certain parameters in connection with resource collision avoidance in sidelink for DRX, according to some embodiments. FIG. 6 illustrates a network (NW) (e.g., that includes one or more network nodes), a UE1, a UE2, and a UE3. Certain embodiments illustrated in FIG. 6 may assume that the DRX coordination among multiple UEs in sidelink is made as a fixed rule.

As illustrated at 600, the NW may transmit, to the UE1, the UE2, and/or the UE3, a DRX setting that includes a resource assignment configuration (e.g., in a configuration message). The network may set one or more DRX periods in time for the UE(s) to choose. This alignment may be negotiated internally between UEs, set in the pre-configuration, or set by a group leader, in certain embodiments. The configuration may set one or more start times for the resource selection windows after the start time of a DRX cycle on-duration (n). Resource selection windows may be, for example, indicated by an offset (k) to the start time (n). The offset (k) can be within a range of $[0, s, s*2, \ldots, s*N_{windows}]$, where s may be the size of the resource selection window in samples, (sub)frames, or milliseconds, and $N_{windows}$ may be the maximal number of windows configured, for example, by RRC, medium access control (MAC), or pre-configuration.

As illustrated at 602, the UE1 (e.g., an application layer of the UE1, in certain embodiments) may request a resource reservation toward the UE2. Upon V2X request for data transfer in sidelink between, for example, the UE1 and the UE2, or the UE2 and the UE3, the UE1 may select a DRX cycle on-duration starting at time (n), where n may be equal for both the UE1 and the UE2, increasing the probability for a collision.

As illustrated at 604, the UE may select a suitable DRX period (e.g., within a range of network configurations fulfilling, for example, the QoS requirements). As illustrated at 606, an offset (k) within the selected DRX period is selected, for example, from among the offsets configured by the NW. The UE1 may select the offset or corresponding resource selection window based on random selection. Additionally, or alternatively, the UE1 may select the offset based on an identifier for the UE1 (e.g., a radio network temporary identifier (RNTI), and/or the like). For example, the offset (k) may be selected according to the following equation 1:

$$k=UE_{ID}\% N_{windows}*s \quad (1)$$

where $UE_{ID}$ may represent the UE identifier, $N_{windows}$ may represent the maximal number of resource selection windows configured, s may represent the size of the window, and % may denote modulo division. Additionally, or alternatively, the UE1 may select the offset based on a lower layer identifier, such as a destination identifier (e.g., a layer 2 destination identifier (DST-L2-ID)). For example, the offset (k) may be selected according to the following equation 2:

$$k=dst_{ID}\% N_{windows}*s \quad (2)$$

where $dst_{ID}$ may represent the destination identifier. As described elsewhere herein, the UE1 may determine the boundaries of a resource selection window based on the selected k, and may select a resource in the resource selection window for transmission of data.

For a sidelink transmission from UE1 to UE2, the identifier of UE2 may be determined by UE2 and shared with UE1 afterwards. Thus, UE1 may use the identifier determined by UE2 as the destination identifier for the transmission(s) to UE2. When the UE2 determines its identifier, which may be used by peer UE(s) (e.g., UE1 and UE3) as the destination identifier to determine the resource selection window (e.g., the value of k based on the equation 2) to transmit to the UE2, the UE2 may consider the identifier(s) of the peer UE(s). The UE2 may prioritize using an identifier that results in a value of k that does not collide with the k value(s) of the peer UE(s). Thus, when the peer UE(s) transmit to the UE2 by using the k value for the UE2, the UE2 may not transmit to other UEs, e.g., the peer UE(s). In this way, the collision due to simultaneous transmissions from two end UEs of one sidelink towards each other can be avoided.

If such an identifier providing an un-collided value k cannot be found, a collision may happen, as two end UEs of a sidelink may select the same resource selection window (e.g., the same value for k). Thus, in order to reduce the collision probability, the UE2 may prioritize selecting an identifier that results in the least collision(s) with its peer UE(s) in terms of the resource selection window or the value k. In addition, the UE2 may negotiate with those peer UE(s) with a colliding value k, such that the collided resource selection window size in k is increased. This may result in there being more resources for the colliding UEs to use in the collided resource selection window, which may decrease the collision probability.

Utilizing destination identifiers, for example, in the manner described above may allow for a single destination to receive from multiple transmitting source UEs at the same time or from the same resource selection window, which may allow for greater power saving, as the destination UE may go to a power saving state outside the resource selection window. Unless the receiver at the destination is not capable of receiving simultaneously, then the calculation of k based on the destination identifier may also be based on a set of resources (m), where the destination UE is able to receive simultaneously.

As illustrated at 608, 610, and 612, the UE2 may perform operations similar to operations 602, 604, and 606, respectively. Where the UE1 was described as performing operations with respect to the UE2 (e.g., based on an identifier for the UE2), the UE2 may perform operations with respect to the UE3 (e.g., based on an identifier for UE3). In addition, operations of the UE2 described in the context of the operations of the UE1, such as identifier selection, may be performed by the UE3.

As illustrated at 614 and 616, sensing by the UE1 and the UE2 may start. For example, the UEs may start the sensing procedure before the DRX time (n) occurs. As illustrated at 618, the DRX period (n) may occur for the UE1, the UE2, and the UE3. As illustrated at 620, for example, upon reaching time (n), the UE2, which may have selected a k value of k=0, may start transmitting at a time between n and n+s to the UE3. As illustrated at 622, for example, upon reaching time n plus s, the UE1, which may have selected a k value of k=s, may transmit data to the UE2 at a time between n+s and n plus two times s (n+2s). This result may be different than a result that could have occurred using other DRX-related mechanisms. For example, those mechanisms may have resulted in the UE1 transmitting to the UE2 at the same time the UE2 was transmitting to the UE3, resulting in the UE2 not being able to listen to the UE1 due to not being able to receive and transmit at the same time. In this way, certain embodiments described herein conserve processing resources and/or network resources (e.g., bandwidth) that would otherwise be consumed as a result of the issues with other mechanisms.

As described above, FIG. 6 is provided as an example. Other examples are possible, according to some embodiments.

Figure 7:
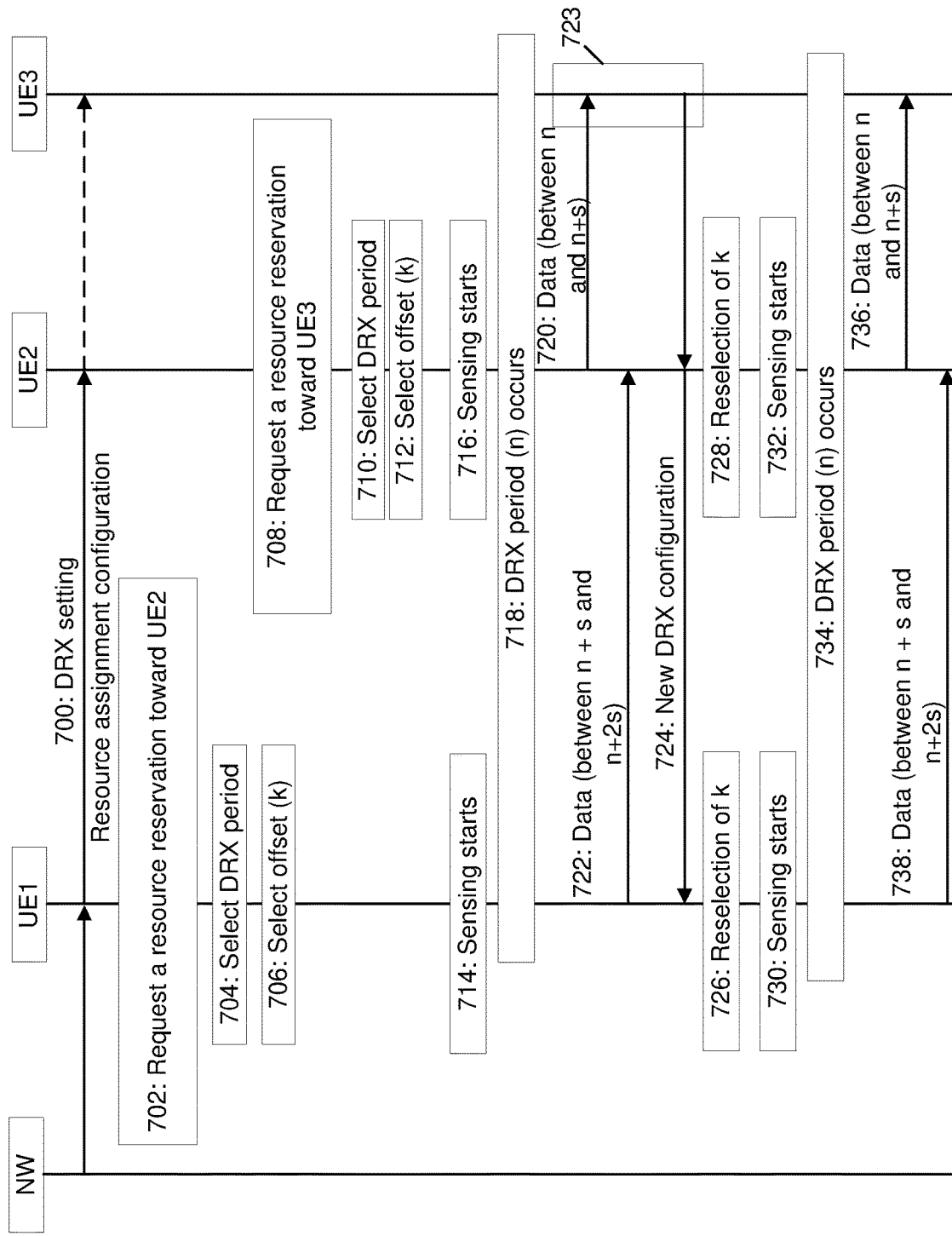
FIG. 7 illustrates an example signal diagram of dynamic selection of certain parameters in connection with resource collision avoidance in sidelink for DRX, according to some embodiments.

FIG. 7 illustrates an example signal diagram of dynamic selection of certain parameters in connection with resource collision avoidance in sidelink for DRX, according to some embodiments. FIG. 7 illustrates a NW, a UE1, a UE2, and a UE3. Certain embodiments described with respect to FIG. 7 include the offset k and window sizes s being dynamically altered by the network, UE(s), or another entity (e.g., based on determined load on a channel).

FIG. 7 illustrates operations of the NW, the UE1, the UE2, and the UE3 at 700, 702, 704, 706, 708, 710, 712, 714, 716, 718, 720, and 722, which may be performed in a manner similar to operations, 600, 602, 604, 606, 608, 610, 612, 614, 616, 618, 620, and 622, respectively. At 723, the UE3 may receive a data transmission and/or may perform sensing during a DRX on-duration. Based on sensing by the UE3, which may have had no transmissions at the given DRX cycle on-duration, the UE3 may determine a set of sensing results indicating a resource usage, a set of suggestions for improved re-selection of parameters (e.g., a reduced or an increased value for a parameter based on, for example, congestion of the system), or new values for one or more offsets k from which a k is to be selected. In certain embodiments, the sensing and reconfiguration may be performed by a group leader UE, a master UE, and/or a by the NW. In another example, the sensing procedure and the reconfiguration procedure may be performed by different entities, correspondingly, e.g., UE/NW may collect the sensing results from other UEs and determine the reconfiguration accordingly. In certain embodiments, the sensing results may be a set of reports to, for example, the group leader UE, the master UE, and/or the network, regarding channel occupancy. The sensing may be performed at a fixed interval, may be triggered by certain events, and/or the like. As illustrated at 724, the UE3 may transmit, to the UE1 and the UE2, a new DRX (re)configuration that includes information identifying the set of sensing results, the set of suggestions, or the new values. For example, the UE3 may provide the new DRX configuration to the UEs in a group. In addition, the new DRX configuration may or may not contain the new resource selection window configuration.

As illustrated at 726 and 728, the UE1 and the UE2, respectively, may perform a re-selection of the offset (k) based on the new DRX configuration, in a manner similar to that described 706 (for operation 726) and at 712 (for operation 728). Additionally, or alternatively, the UE1 and the UE2 may perform a re-calculation of parameters (s) and/or ($N_{windows}$) The re-selection of k and the re-calculation of s and/or $N_{windows}$ may occur at different times and/or intervals. For example, triggering of the re-calculation of s and/or $N_{windows}$ may occur less or more often than re-selection of k depending on whether congestion/channel occupancy changes (or not at all if the network utilizes a fixed set of rules for such calculation). As illustrated at 730 and 732, sensing for the UE1 and the UE2, respectively, may start, in a manner similar to that described at 714 (for operation 730) and at 716 (for operation 732). The sensing result used to recalculate s and $N_{windows}$ may be combined by a single entity, using measurements from different UEs. As illustrated at 734, the DRX period (n) may occur for the UE1, the UE2, and the UE3, in a manner similar to that described at 718. As illustrated at 736, the UE2 may transmit data at time between n and n+s, if k=0 is selected, in a manner similar to that described at 720. As illustrated at 738, the UE1 may transmit data at time between n+s and n+2s, if k=s is selected.

As described above, FIG. 7 is provided as an example. Other examples are possible, according to some embodiments.

As described with respect to FIGS. 6 and 7, certain embodiments may include operations for selecting k and for calculating s and/or $N_{windows}$. For example, s and/or $N_{windows}$ may be parameters that determine, indicate, or are based on channel usage, and that may be calculated independently of selection of k (the parameter that indicates the start of a resource selection window). The recalculation of s and/or $N_{windows}$ (as illustrated in FIG. 7) may be based on sensing results related to, for example, the channel occupancy or congestion (e.g., a quantity of UEs in a specific cell or using a DRX window). Such sensing results may be from the UE that is to transmit the data (e.g., UE1 or UE2), from another UE (e.g., UE3), or from the network (e.g., based on the amount of registered UEs within a cell, or for a certain configuration).

Triggering of re-calculation of s and/or $N_{windows}$ may be, therefore, independent of the selection of k, and can occur less or more often, or not at all based on the change in congestion/channel occupancy. The selection (or re-selection) of k, on the other hand, may be performed within a UE, received from a group leader, or may be negotiated. As such, certain embodiments may include the combination of three parameters k, s, and $N_{windows}$, in addition to k being pseudo random (e.g., controlled).

Certain embodiments described herein may additionally, or alternatively, provide for a UE to select between multiple values of k based on, for example, sensing a potential to select an unused, or less crowded, sub-pool. This may allow for a UE, which determines it is in an unideal scenario, to attempt transmitting using a different value of k. Such selection may be random. Additionally, or alternatively, such selection may be controlled by a threshold on, for example, logical channel priority set by the network or by pre-configuration. Such a threshold may help to ensure that a limited amount of UEs are allowed to change the value k, which may help to ensure a lower value of reselecting UEs. Such selection may be controlled by a fixed probability distribution, such as distribution 800 illustrated in FIG. 8. This function may be applied to the relevant resources either based on the mean or center value of the resources after they have been sensed, or before the selection window based on k.

As described elsewhere herein, certain embodiments may select the offset k and number of resource selection windows. In this way, the selection may be controlled based on the congestion of the system. For example, if there are few UEs, then the number of DRX periods may be few, and the spread of k values may be low. If there are several UEs, the number of DRX periods may be higher, with a greater spread of k.

Figure 8:
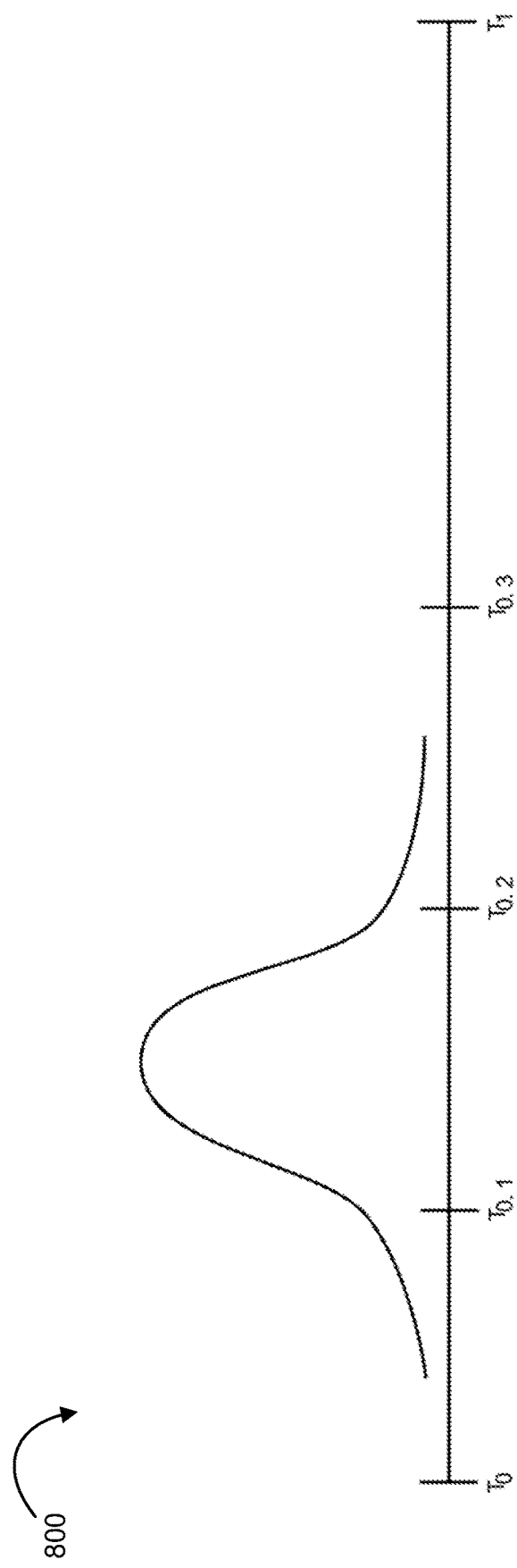
FIG. 8 illustrates an example of a probability distribution for selecting resources within a resource selection window, according to some embodiments.

With respect to FIG. 8, certain embodiments do not preclude that time T0.3, for example, is the end of the DRX period, and/or that the time between T0.3 and T1 is to be either unused or reserved for other purposes. In addition, certain embodiments do not preclude the DRX periods from filling the area between TO and T1. These variations may depend on simulation and network configuration.

According to certain embodiments, the value of k and the number of windows may be determined by the network based on a configuration (e.g., a fixed setting, load prediction, or a current number of registered devices in the system). Additionally, or alternatively, the value of k and the number of windows may be determined by sensing. For example, the value of k and the number of windows may be determined by the number of devices currently sensed in the system. As another example, the value of k and the number of windows may be determined by introducing a way of detecting the change in the number of devices, or DRX periods, which may cause UEs to re-select resources to a point where optimal DRX behavior can be achieved (e.g., in case several UEs have left the cell and/or released the logical channels).

Certain embodiments may be extended and applicable for sidelink relay. For example, considering a relay scenario where the transmission between the network and the UE3 may occur via the UE1 and the UE3 (e.g., network to UE1 to UE2 to UE3), the identifier selection procedure at a UE (e.g., as described with respect to 606 and/or 706) may prioritize selecting an identifier such that the resource selection window for transmitting via a preceding hop (e.g., UE1 to UE2) is earlier than the resource selection window for transmitting via a later hop (e.g., from UE2 to UE3). In this approach, the end-to-end latency for the transmission between the network and the UE3 can be minimized, as the latency for the end-to-end transmission via multi-hops can be controlled to be smaller than one DRX-on-duration.

As explained above, certain attempts at mitigating collision of resource selection may focus on reaching an equal distribution of the selected resources across the resource pool. Certain embodiments described herein may provide for avoiding this by creating sub-pools defined per DRX. These sub-pools may be defined to be selected in order to avoid resource selection collision.

Figure 9:
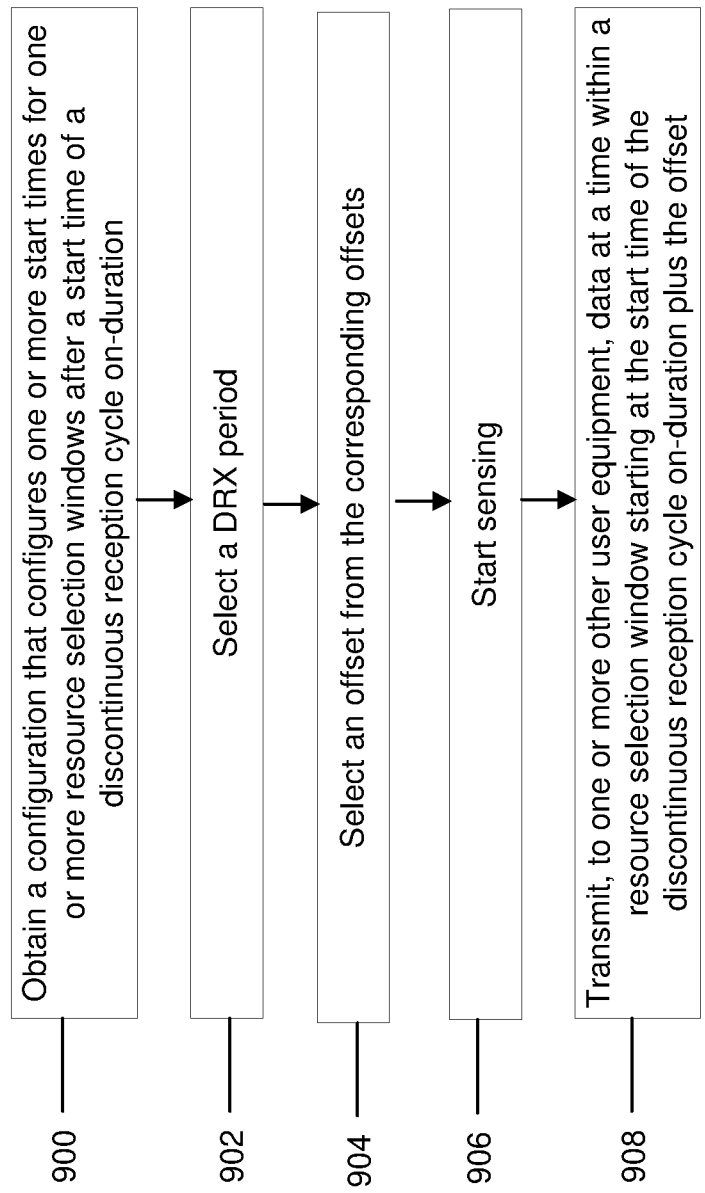
FIG. 9 illustrates an example flow diagram of a method, according to some embodiments.

FIG. 9 illustrates an example flow diagram of a method, according to some embodiments. For example, FIG. 9 shows example operations of a UE (e.g., apparatus 20). Some of the operations illustrated in FIG. 9 may be similar to some operations shown in, and described with respect to, FIGS. 1-8.

In an embodiment, the method may include, at 900, obtaining a configuration that configures one or more start times for one or more resource selection windows after a start time of a discontinuous reception cycle on-duration (e.g., in a manner similar to that described at 600 and/or 700). The one or more start times for the one or more resource selection windows may be indicated by corresponding offsets to the start time of the discontinuous reception cycle on-duration. The method may include, at 902, selecting a DRX period (e.g., in a manner similar to that described at 604 and/or 704). The method may include, at 904, selecting an offset from the corresponding offsets (e.g., in a manner similar to that described at 606 and/or 706). The method may include, at 906, starting sensing (e.g., in a manner similar to that described at 614 and/or 714). The method may include, at 908, transmitting, to one or more other user equipment, data at a time within a resource selection window starting at the start time of the discontinuous reception cycle on-duration plus the offset (e.g., in a manner similar to that described at 622 and/or 722).

In some embodiments, the obtaining the configuration may include obtaining the configuration via reception of a configuration message that comprises the configuration, and/or obtaining the configuration via a setting. In some embodiments, the offset may be within a range of values based on a size of the resource selection window and a quantity of resource selection windows configured. In some embodiments, the offset may be selected as a value equal to a multiple of the size of the resource selection window. In some embodiments, the method may further include obtaining information regarding at least one of a set of sensing results indicating a resource usage, a set of suggestions for improved re-selection of a parameter, or new values for the one or more offsets. In some embodiments, the method may further include re-selecting the offset based on the set of suggestions or from the new values, and/or re-calculating the size of the corresponding resource selection window or the quantity of resource selection windows based on the set of sensing results and/or suggestions.

In some embodiments, the selecting the offset may further include selecting the offset based on at least one of: random selection, wherein a probability distribution associated with the random selection of the offset may vary for different random selections, an identifier associated with the user equipment, or an identifier associated with a destination or a source of the transmission or another lower layer identifier. In some embodiments, the resource selection window may end before a start time of a next resource selection window. In some embodiments, selecting the offset based on the identifier associated with the user equipment or the identifier associated with the destination or the source may further include deriving or obtaining one or more identifiers such that the selected offset does not result in a collision with one or more other offsets selected by the one or more other user equipment.

As described above, FIG. 9 is provided as an example. Other examples are possible according to some embodiments.

Figure 10:
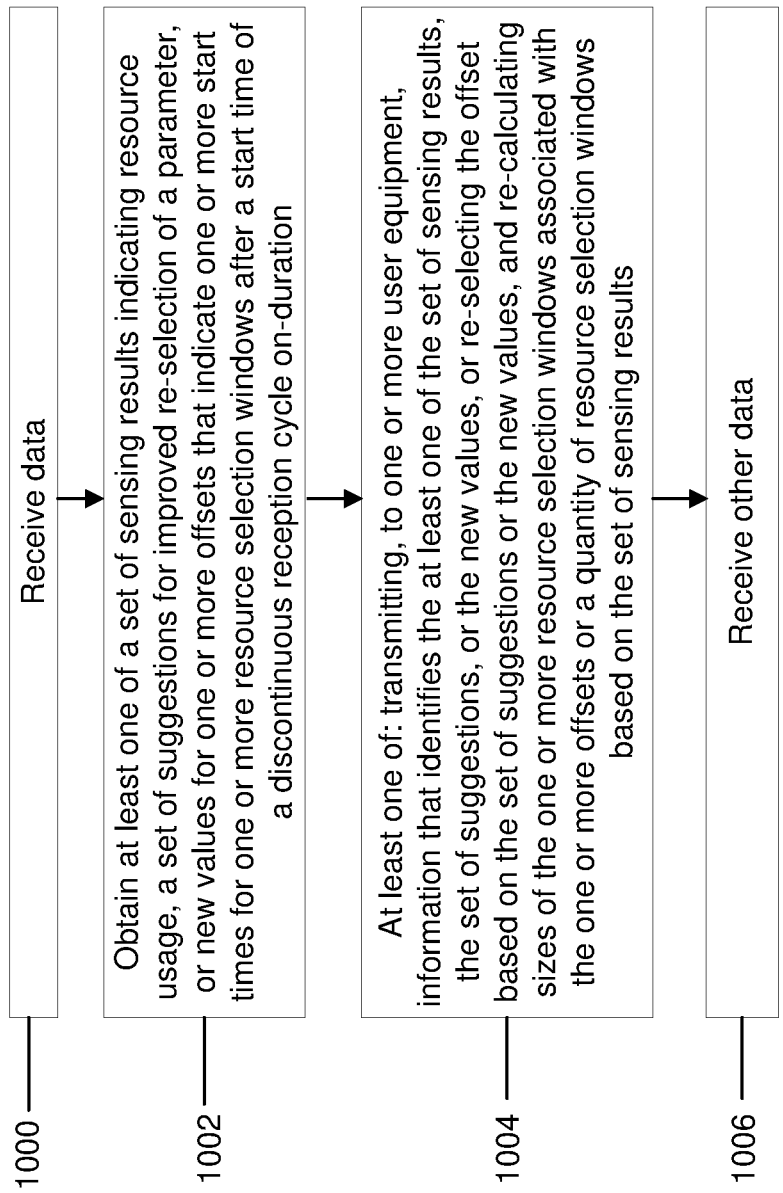
FIG. 10 illustrates an example flow diagram of a method, according to some embodiments.

FIG. 10 illustrates an example flow diagram of a method, according to some embodiments. For example, FIG. 10 shows example operations of a user equipment (e.g., apparatus 20). Some of the operations illustrated in FIG. 10 may be similar to some operations shown in, and described with respect to, FIGS. 1-8.

In an embodiment, the method may include, at 1000, receiving data (e.g., in a manner similar to that described at 720). The method may include, at 1002, obtaining at least one of a set of sensing results indicating resource usage, a set of suggestions for improved re-selection of a parameter, or new values for one or more offsets that indicate one or more start times for one or more resource selection windows after a start time of a discontinuous reception cycle on-duration (e.g., in a manner similar to that described at 723). The method may include, at 1004, at least one of: transmitting, to one or more user equipment, information that identifies the at least one of the set of sensing results, the set of suggestions, or the new values (e.g., in a manner similar to that described at 724), or re-selecting the offset based on the set of suggestions or the new values, and re-calculating sizes of the one or more resource selection windows associated with the one or more offsets or a quantity of resource selection windows based on the set of sensing results (e.g., in a manner similar to that described at 726 or 728). The method may include, at 1006, receiving other data (e.g., in a manner similar to that described at 736 or 738).

In some embodiments, the set of sensing results may be based on sensing by a user equipment, where the user equipment did not perform a transmission during the discontinuous reception cycle on-duration. In some embodiments, the set of sensing results may be based on sensing that comprises one or more reports related to an occupancy of a channel. In some embodiments, the resource usage may indicate an occupancy of a channel. In some embodiments, the device may include at least one of a group leader user equipment, a master user equipment, or a network entity.

As described above, FIG. 10 is provided as an example. Other examples are possible according to some embodiments.

FIG. 11a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 11a.

As illustrated in the example of FIG. 11a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-10. For instance, in one embodiment, apparatus 10 may be controlled by memory 14 and processor 12 to provide a DRX setting in a manner similar to that described at 600 and/or 700.

FIG. 11b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11b.

As illustrated in the example of FIG. 11b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-10.

For instance, in one embodiment, apparatus 20 may be controlled by memory 24 and processor 22 to obtain a configuration that configures one or more start times for one or more resource selection windows after a start time of a discontinuous reception cycle on-duration. The one or more start times for the one or more resource selection windows may be indicated by corresponding offsets to the start time of the discontinuous reception cycle on-duration. In one embodiment, apparatus 20 may be controlled by memory 24 and processor 22 to select an offset from the corresponding offsets. In one embodiment, apparatus 20 may be controlled by memory 24 and processor 22 to transmit, to one or more other user equipment, data at a time within a resource selection window starting at the start time of the discontinuous reception cycle on-duration plus the offset.

In an embodiment, apparatus 20 may be controlled by memory 24 and processor 22 to obtain at least one of a set of sensing results indicating resource usage, a set of suggestions for improved re-selection of a parameter, or new values for one or more offsets that indicate one or more start times for one or more resource selection windows after a start time of a discontinuous reception cycle on-duration. In an embodiment, apparatus 20 may be controlled by memory 24 and processor 22 to, at least one of: transmit, to one or more user equipment, information that identifies the at least one of the set of sensing results, the set of suggestions, or the new values, or re-select the offset based on the set of suggestions or the new values, and re-calculate sizes of the one or more resource selection windows associated with the one or more offsets or a quantity of resource selection windows based on the set of sensing results.

Therefore, certain example embodiments provide several technological improvements, enhancements, and/or advantages over existing technological processes. For example, one benefit of some example embodiments includes helping to avoid an increased probability of collisions introduced by DRX operations for mode 2 resource reselection. This may address concerns related to collision occurrence between resources, which may cause a loss of data, either due to issues associated with full duplexing, or increased interference from devices that are close to each other and simultaneously transmitting data. Accordingly, the use of some example embodiments results in improved functioning of communications networks and their nodes and, therefore constitute an improvement at least to the technological field of resource selection, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method, comprising:
    obtaining, by a user equipment, a configuration that configures one or more start times for one or more resource selection windows after a start time of a discontinuous reception (DRX) cycle on-duration, wherein the one or more start times for the one or more resource selection windows are indicated by corresponding offsets to the start time of the discontinuous reception cycle on-duration;
    deriving an identifier such that an offset does not result in a collision with one or more other offsets selected by one or more other user equipment
    selecting an offset from the corresponding offsets based on the following: random selection, wherein a probability distribution associated with the random selection of the offset varies for different random selections, the derived identifier, an identifier associated with the user equipment, an identifier associated with a destination, and a source of a transmission, wherein the offset is selected as a value equal to a multiple of a size of the one or more resource selection windows and a quantity of resource selection windows;
    based on a new discontinuous reception (DRX), obtaining information regarding a set of sensing results indicating a resource usage, a set of suggestions for improved re-selection of a parameter, and new values for one or more offsets;
    selecting a new identifier such that a corresponding resource selection window for transmitting via a preceding hop is earlier than a resource selection window for transmitting via a later hop;
    re-selecting the offset based on the set of suggestions and the new identifier;
    re-calculating a size of the corresponding resource selection window based on the set of sensing results; and
    transmitting, to one or more other user equipment, data at a time within the corresponding resource selection window starting at the start time of the new DRX cycle on-duration plus the re-selected offset.

2. The method according to claim 1, wherein obtaining the configuration further comprises: obtaining the configuration via reception of a configuration message that comprises the configuration, or obtaining the configuration via a setting.

3. The method according to claim 2, wherein selecting the offset based on the identifier associated with the user equipment or the identifier associated with the destination or the source further comprises:
    deriving one or more identifiers such that the selected offset does not result in a collision with one or more other offsets selected by the one or more other user equipment.

4. A user equipment comprising:
    a processor; and
    a memory comprising computer-executable instructions that, when executed by the processor, cause the user equipment to perform the following operations:
        obtaining a configuration that configures one or more start times for one or more resource selection windows after a start time of a discontinuous reception (DRX) cycle on-duration, wherein the one or more start times for the one or more resource selection windows are indicated by corresponding offsets to the start time of the discontinuous reception cycle on-duration;
        deriving an identifier such that an offset does not result in a collision with one or more other offsets selected by one or more other user equipment
        selecting an offset from the corresponding offsets based on the following: random selection, wherein a probability distribution associated with the random selection of the offset varies for different random selections, the derived identifier, an identifier associated with the user equipment, an identifier associated with a destination, and a source of a transmission, wherein the offset is selected as a value equal to a multiple of a size of the one or more resource selection windows and a quantity of resource selection windows;
        based on a new discontinuous reception (DRX), obtaining information regarding a set of sensing results indicating a resource usage, a set of suggestions for improved re-selection of a parameter, and new values for one or more offsets;
        selecting a new identifier such that a corresponding resource selection window for transmitting via a preceding hop is earlier than a resource selection window for transmitting via a later hop;
        re-selecting the offset based on the set of suggestions and the new identifier;
        re-calculating a size of the corresponding resource selection window based on the set of sensing results; and
        transmitting, to one or more other user equipment, data at a time within the corresponding resource selection window starting at the start time of the new DRX cycle on-duration plus the re-selected offset.

5. A system comprising:
    user equipment;
    a processor; and
    a memory comprising computer-executable instructions that, when executed by the processor, cause the user equipment to perform the following operations:
        obtaining a configuration that configures one or more start times for one or more resource selection windows after a start time of a discontinuous reception (DRX) cycle on-duration, wherein the one or more start times for the one or more resource selection windows are indicated by corresponding offsets to the start time of the discontinuous reception cycle on-duration;

deriving an identifier such that an offset does not result in a collision with one or more other offsets selected by one or more other user equipment selecting an offset from the corresponding offsets based on the following: random selection, wherein a probability distribution associated with the random selection of the offset varies for different random selections, the derived identifier, an identifier associated with the user equipment, an identifier associated with a destination, and a source of a transmission, wherein the offset is selected as a value equal to a multiple of a size of the one or more resource selection windows and a quantity of resource selection windows;

based on a new discontinuous reception (DRX), obtaining information regarding a set of sensing results indicating a resource usage, a set of suggestions for improved re-selection of a parameter, and new values for one or more offsets;

selecting a new identifier such that a corresponding resource selection window for transmitting via a preceding hop is earlier than a resource selection window for transmitting via a later hop;

re-selecting the offset based on the set of suggestions and the new identifier;

re-calculating a size of the corresponding resource selection window based on the set of sensing results; and transmitting, to one or more other user equipment, data at a time within the corresponding resource selection window starting at the start time of the new DRX cycle on-duration plus the re-selected offset.

* * * * *